(12) United States Patent
Reznik

(10) Patent No.: US 6,329,005 B1
(45) Date of Patent: Dec. 11, 2001

(54) RAPID COOLING OF SEALED PACKAGE

(76) Inventor: David Reznik, 12690 Viscaino Rd., Los Altos Hills, CA (US) 94022

( * ) Notice: Subject to any disclaimer, the term of this patent is extended or adjusted under 35 U.S.C. 154(b) by 0 days.

(21) Appl. No.: 09/608,215

(22) Filed: Jun. 30, 2000

(51) Int. Cl.⁷ .................. A23L 3/00; B65B 55/00
(52) U.S. Cl. .................. 426/393; 62/268; 99/472; 165/104.27; 426/524
(58) Field of Search .................. 426/524, 393, 99/454, 470, 472; 62/268, 269, 116; 165/104.27

(56) References Cited

U.S. PATENT DOCUMENTS

| | | | |
|---|---|---|---|
| 2,996,898 | * 8/1961 | Hosken et al. | 62/268 |
| 4,576,014 | * 3/1986 | Miller et al. | 62/268 |
| 4,826,698 | 5/1989 | Reznik | 426/320 |
| 5,928,699 | 7/1999 | Reznik | 426/524 |

OTHER PUBLICATIONS

"Raztek Publications/News," www.raztek.com/news, pp. 1–5, 1998.
"Raztek Publications/Patents," www.raztek.com/patents, pp. 1–3, 1998.
"Raztek Technologies," www.raztek.com/technol.html, pp. 1–4, 1998.
"Raztek Technologies/Electroheating," www.raztek.com/electroheating, pp. 1–3, 1998.

* cited by examiner

Primary Examiner—George C. Yeung
(74) Attorney, Agent, or Firm—Pillsbury Winthrop LLP

(57) ABSTRACT

Rapid cooling apparatus including a vacuum chamber, a vacuum pump in fluid communication with the vacuum chamber for decreasing pressure in the vacuum chamber, a heat-transfer fluid disposed inside the vacuum chamber, and a substance generally sealed in a package in heat-transfer contact with the heat-transfer fluid inside the vacuum chamber. Preferably the package is constructed of an expandable material.

14 Claims, 1 Drawing Sheet

RAPID COOLING OF SEALED PACKAGE

FIELD OF THE INVENTION

The present invention relates to rapid vacuum cooling generally and more particularly to rapid vacuum cooling of substances sealed in a package that have been hot-filled or heat processed.

BACKGROUND OF THE INVENTION

In food processing, particularly processing of proteinaceous food products, the speed of cooling is exceedingly critical. Failure to cool a food product sufficiently quickly may lead to undesirable effects on the flavor, aroma, texture or other important characteristics of the food product.

There are two general methods of cooling a hot product and filling a container with the product. In one method, the product is rapidly cooled and afterwards placed in a container. However, since the container is cold-filled, precautions must be taken to prevent post contamination of the product, making the procedure relatively expensive. In another method, the container is hot-filled with the product. Sealing the container while the product is still hot pasteurizes the package and prevents contamination of the product. However, the method does have a disadvantage of slow heat transfer. This is especially true of large drums or containers, wherein it can take hours for the product to cool.

U.S. Pat. No. 5,928,699 to Reznik, the disclosure of which is incorporated herein by reference, provides an improved rapid vacuum cooling system. The system comprises a housing, a hot fluid coil disposed in the housing through which flows a hot product, a cooling liquid disposed in the housing which fully covers the hot fluid coil, a vacuum pump operatively connected to an interior of the housing for reducing pressure in the housing until the cooling liquid boils and forms vapors, and a condensing coil disposed in the housing through which flows a cold fluid, the condensing coil condensing the vapors of the cooling liquid and thereby heating the cold fluid. The hot product transfers heat to the cooling liquid, causing it to boil.

The system of U.S. Pat. No. 5,928,699 solves the above-mentioned problems of the art, because it rapidly cools any kind of flowable product in a closed, substantially germ-free system. However, a need still exists for rapid cooling of substances, such as certain vegetable products packaged in a sealed package. Of course, packages cannot flow in a hot fluid coil, and so the system of U.S. Pat. No. 5,928,699 cannot be used to cool them.

SUMMARY OF THE INVENTION

The present invention seeks to provide improved methods and apparatus for rapid vacuum cooling of substances in a sealed package.

There is thus provided in accordance with a preferred embodiment of the present invention rapid cooling apparatus including a vacuum chamber, a vacuum pump in fluid communication with the vacuum chamber for decreasing pressure in the vacuum chamber, a heat-transfer fluid disposed inside the vacuum chamber, and a substance generally sealed in a package in heat-transfer contact with the heat-transfer fluid inside the vacuum chamber. Preferably the package is constructed of an expandable material.

In accordance with a preferred embodiment of the present invention a condensing coil is disposed inside the vacuum chamber, the coil being adapted for flow therethrough of a coolant.

Further in accordance with a preferred embodiment of the present invention a spray device is inside the vacuum chamber which sprays the heat-transfer fluid onto the package.

Still further in accordance with a preferred embodiment of the present invention a CONVAC system is provided at an inlet to the vacuum chamber operative to generally continuously introduce the package and the substance into the vacuum chamber.

Additionally in accordance with a preferred embodiment of the present invention a CONVAC system is provided at an outlet of the vacuum chamber operative to generally continuously remove the package and the substance from the vacuum chamber. Preferably the CONVAC system at the outlet of the vacuum chamber includes a rotary feeder operative to receive therein the package, and a baffle mounted next to the rotary feeder, wherein as the rotary feeder turns, the package is pressed against the baffle, thereby contracting the package.

There is also provided in accordance with a preferred embodiment of the present invention a method for rapidly cooling a product, including providing rapid cooling apparatus including a vacuum chamber, a vacuum pump in fluid communication with the vacuum chamber for decreasing pressure in the vacuum chamber, a heat-transfer fluid disposed inside the vacuum chamber, and a substance generally sealed in a package in heat-transfer contact with the heat-transfer fluid inside the vacuum chamber, and reducing pressure in the vacuum chamber, thereby causing the heat-transfer fluid to boil, the package to expand in size, and a reduced pressure to be formed inside the package, until generally equilibrium is reached between the reduced pressure inside and outside the package, wherein any water present in the substance boils and condenses on inner walls of the package, and flows back to the substance, heat being transferred from the substance by convection to the inner walls of the package, by conduction through the walls of the package and convection from the package to the heat-transfer fluid.

In accordance with a preferred embodiment of the present invention the rapid cooling apparatus further includes a condensing coil disposed inside the vacuum chamber, and a coolant flowing through the coil, and wherein vapors of the heat-transfer fluid contact the condensing coil and condense thereon, heat being transferred to the coolant.

Further in accordance with a preferred embodiment of the present invention the method includes controlling a rate of condensation of the heat-transfer fluid by controlling a flow rate or a heat transfer characteristic of the coolant flowing through the condensing coil. Still further in accordance with a preferred embodiment of the present invention the method includes removing the package and substance from the vacuum chamber after cooling the package and substance, wherein the package and substance generally contract back to their original volume.

Additionally in accordance with a preferred embodiment of the present invention the pressure in the vacuum chamber is a vacuum of at least 27 inches Hg.

In accordance with a preferred embodiment of the present invention the package is hot-filled and sealed with the substance, such that a minimum quantity of non-condensable gas is present in the package.

Further in accordance with a preferred embodiment of the present invention the step of reducing pressure in the chamber is performed while the chamber is substantially closed.

Still further in accordance with a preferred embodiment of the present invention the package and substance are generally continuously introduced into and removed from the vacuum chamber.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
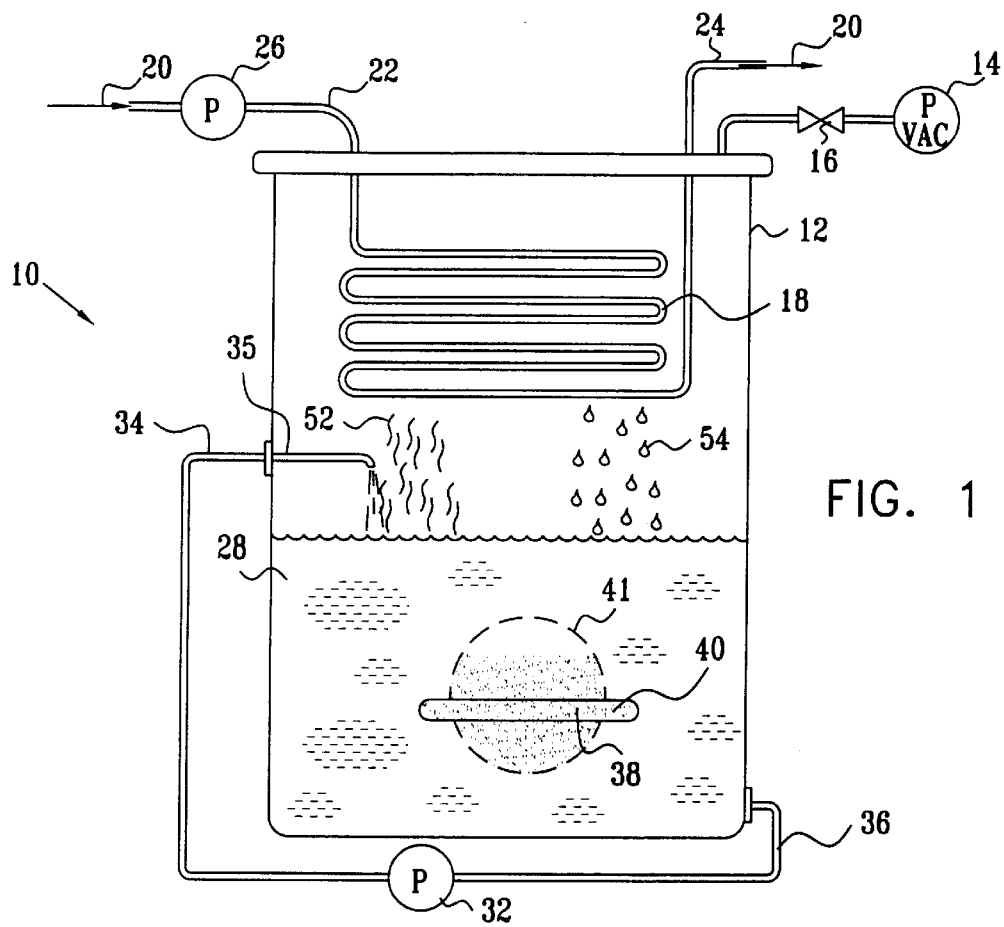
FIG. 1 is a simplified illustration of rapid cooling apparatus constructed and operative in accordance with a preferred embodiment of the present invention, with a substance in a sealed package disposed in a vacuum chamber.

Reference is now made to FIG. 1 which is a simplified illustration of a rapid cooling apparatus 10 constructed and operative in accordance with a preferred embodiment of the present invention.

Rapid cooling apparatus 10 preferably includes a thermally insulated vacuum chamber 12, the interior of which is in communication with a vacuum pump 14 via a shut-off valve 16.

Disposed at the top of vacuum chamber 12 is a condensing coil 18. A coolant 20 (e.g., cold cooling water) enters coil 18 through an inlet conduit 22 and exits at an outlet conduit 24. Inlet conduit 22 and outlet conduit 24 are both illustrated at the top of vacuum chamber 12, but it is appreciated that they may be positioned at other places on vacuum chamber 12. A pump 26 preferably pumps coolant 20 through condensing coil 18.

A heat-transfer fluid 28 is preferably disposed inside vacuum chamber 12, most preferably at the bottom of vacuum chamber 12 opposite condensing coil 18. A substance 38 generally sealed in a package 40 is disposed in heat-transfer fluid 28 inside vacuum chamber 12. Alternatively, fluid 28 may be pumped into vacuum chamber 12 by means of a pump 32 that pumps fluid 28 through an inlet port 34 into vacuum chamber 12 to a spray device or atomizer 35. Spray device 35 sprays fluid 28 onto package 40, thereby cooling substance 38 inside package 40, as is explained more in detail hereinbelow. Fluid 28 may drain and flow back to pump 32 via an exit port 36. Package 40 and substance 38 may be introduced and removed from vacuum chamber 12, one batch after another. Package 40 is preferably constructed of an expandable material, such as thin plastic.

Substance 38 is rapidly cooled in the following manner. After introduction of substance 38 into vacuum chamber 12, vacuum pump 14 reduces the pressure in vacuum chamber 12, until heat-transfer fluid 28 begins to boil. At the required vacuum condition, shut-off valve 16 is closed and the operation is preferably performed in a closed system. (Alternatively, shut-off valve 16 can be left open and the operation performed in an open system.) In the presence of the vacuum in chamber 12, package 40 expands to a shape designated by reference numeral 41, and a vacuum is formed inside package 40. Package 40 continues to expand until generally equilibrium is reached between the vacuum inside and outside package 40. Any water present in substance 38 will also boil at this temperature, condense on the inner walls of package 40 and flow back to substance 38. Heat is rapidly transferred from substance 38 by nucleate-boiling convection to the inner walls of the expanded package 40, by conduction through the walls of package 40 and nucleate-boiling convection from package 40 to heat-transfer fluid 28.

The vacuum in chamber 12 is preferably at least 27 inches Hg. It is noted that for a vacuum of 29 inches Hg, if heat-transfer fluid 28 is water, then fluid 28 will boil at a temperature of about 25° C. In general, the greater the vacuum in chamber 12, the lower the final temperature of substance 38.

Preferably, package 40 has been hot-filled and sealed with substance 38, such that a minimum quantity of non-condensable gas (e.g., air) is present in the head space formed between the walls of the expanded package 40 and the boiling substance 38. This ensures that condensation inside package 40 will be efficient.

Vapors 52 of boiling heat-transfer fluid 28 contact condensing coil 18 and condense thereon, heat being transferred to coolant 20. The rate of condensation may be controlled by the flow rate and heat transfer characteristics of coolant 20 flowing through condensing coil 18. Droplets of condensate 54 fall back into heat-transfer fluid 28, completing the heat transfer cycle. Once package 40 has been cooled and removed from chamber 12, package 40 and substance 38 generally contract back to their original volume.

Figure 2:
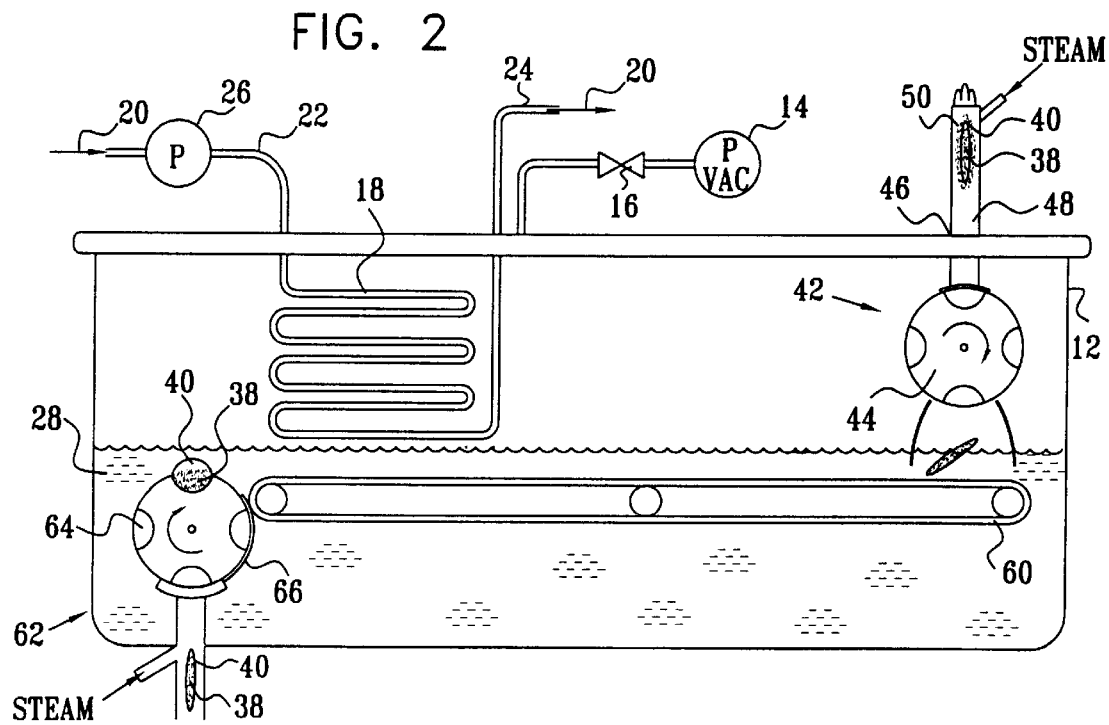
FIG. 2 is a simplified illustration of the rapid cooling apparatus of FIG. 1, constructed and operative in accordance with another preferred embodiment of the present invention, with a system for continuous introduction and removal of the substance in the sealed package into and out of the vacuum chamber.

In an alternative embodiment, shown schematically in FIG. 2, package 40 and substance 38 may be generally continuously introduced into and removed from vacuum chamber 12 by means of CONVAC system 42. CONVAC system 42, commercially available from Raztek Corporation, Sunnyvale, Calif., USA, is built in accordance with the teachings of U.S. Pat. No. 4,826,698, the disclosure of which is incorporated herein by reference. CONVAC system 42 basically comprises a rotary feeder 44 disposed within vacuum chamber 12, maintained at the pressure and temperature conditions of the interior of vacuum chamber 12. Rotary feeder 44, typically comprising a multi-pocket wheel, communicates with an access port 46 of vacuum chamber 12, via a conduit 48 extending into chamber 12. Conduit 48 is preferably filled with a condensable gas 50, such as steam, substantially to the exclusion of atmospheric air. Package 40, with substance 38 inside, may be introduced into vacuum chamber 12 via conduit 48, simultaneously with condensable gas 50. Condensable gas 50 condenses inside vacuum chamber 12, thereby preventing loss of vacuum. In this manner, package 40, with substance 38 inside, can be introduced into and removed from chamber 12 continuously, instead of in a batch process.

As described above, in the presence of the vacuum in chamber 12, package 40 expands to the shape designated by reference numeral 41, and a vacuum is formed inside package 40. Package 40 continues to expand until equilibrium is reached between the vacuum inside and outside package 40. Any water present in substance 38 will also boil at this temperature, condense on the inner walls of package 40 and flow back to substance 38. Heat is rapidly transferred from substance 38 by nucleate-boiling convection to the inner walls of the expanded package 40, by conduction through the walls of package 40 and nucleate-boiling convection from package 40 to heat-transfer fluid 28.

The expanded package 40 preferably advances during its cooling through chamber 12 on a conveyor 60, until it reaches a second CONVAC system 62. The expanded package 40 is received in a rotary feeder 64. Preferably a baffle 66 is mounted next to rotary feeder 64. As rotary feeder 64 turns, the expanded package 40 is pressed against baffle 66, thereby contracting package 40. Package 40 contracts back generally completely to its original size upon exiting vacuum chamber 12.

It will be appreciated by persons skilled in the art that the present invention is not limited to what has been particularly shown and described hereinabove. Rather the scope of the present invention includes both combinations and subcombinations of the various features described hereinabove as well as variations and development thereof which would naturally occur to a person of ordinary skill in the art upon reading the disclosure and which are not in the prior art.

What is claimed is:

1. Rapid cooling apparatus comprising:
   a vacuum chamber;
   a vacuum pump in fluid communication with said vacuum chamber for decreasing pressure in said vacuum chamber;
   a heat-transfer fluid disposed inside said vacuum chamber;
   a moisture-containing product generally sealed in a package in heat-transfer contact with said heat-transfer fluid inside said vacuum chamber; and
   a continuous-vacuum-introduction (CONVAC) system at an outlet of said vacuum chamber operative to generally continuously remove said package and said moisture-containing product from said vacuum chamber, said continuous-vacuum-introduction (CONVAC) system at the outlet of said vacuum chamber comprising a rotary feeder operative to receive therein said package, and a baffle mounted next to said rotary feeder, wherein as said rotary feeder turns, said package is pressed against said baffle, thereby contracting said package.

2. Apparatus according to claim 1 wherein said package is constructed of an expandable material.

3. Apparatus according to claim 1 and further comprising a condensing coil disposed inside said vacuum chamber, said coil being adapted for flow therethrough of a coolant.

4. Apparatus according to claim 1 and further comprising a spray device inside said vacuum chamber which sprays said heat-transfer fluid onto said package.

5. Apparatus according to claim 1 further comprising a continuous-vacuum-introduction (CONVAC) system at an inlet to said vacuum chamber operative to generally continuously introduce said package and said moisture-containing product into said vacuum chamber.

6. A method for rapidly cooling a moisture-containing product, comprising:
   providing rapid cooling apparatus with a vacuum chamber, a vacuum pump in fluid communication with said vacuum chamber for decreasing pressure in said vacuum chamber, a heat-transfer fluid disposed inside said vacuum chamber, and a moisture-containing product generally sealed in a package in heat-transfer contact with said heat-transfer fluid inside said vacuum chamber; and reducing pressure in said vacuum chamber, thereby causing said heat-transfer fluid to boil, said package to expand in size, and a reduced pressure to be formed inside said package, until generally equilibrium is reached between the reduced pressure inside and outside said package, wherein any water present in said moisture-containing product boils and condenses on inner walls of said package, and flows back to said moisture-containing product, heat being transferred from said moisture-containing product by convection to the inner walls of said package, by conduction through the walls of said package and convection from said package to said heat-transfer fluid.

7. The method according to claim 6 wherein said rapid cooling apparatus further comprises a condensing coil disposed inside said vacuum chamber, and a coolant flowing through said coil, and wherein vapors of said heat-transfer fluid contact said condensing coil and condense thereon, heat being transferred to said coolant.

8. The method according to claim 7 further comprising controlling a rate of condensation of said heat-transfer fluid by controlling a flow rate of said coolant flowing through said condensing coil.

9. The method according to claim 7 further comprising controlling a rate of condensation of said heat-transfer fluid by controlling a heat transfer characteristic of said coolant flowing through said condensing coil.

10. The method according to claim 6 further comprising removing said package and moisture-containing product from said vacuum chamber after cooling said package and moisture-containing product, wherein said package and moisture-containing product generally contract back to their original volume.

11. The method according to claim 6 wherein the pressure in said vacuum chamber comprises a vacuum of at least 27 inches Hg.

12. The method according to claim 6 wherein said package is hot-filled and sealed with said moisture-containing product, such that a minimum quantity of non-condensable gas is present in said package.

13. The method according to claim 6 wherein the step of reducing pressure in said chamber is performed while said chamber is substantially closed.

14. The method according to claim 6 wherein said package and moisture-containing product are generally continuously introduced into and removed from said vacuum chamber.

* * * * *